SPACE SATELLITES FOR USE AS RADIO SYSTEM REPEATERS

Filed May 21, 1959 2 Sheets-Sheet 1

INVENTOR
C. C. CUTLER
BY S. W. Adams, Jr.
ATTORNEY

Oct. 9, 1962 C. C. CUTLER 3,058,106

SPACE SATELLITES FOR USE AS RADIO SYSTEM REPEATERS

Filed May 21, 1959 2 Sheets-Sheet 2

INVENTOR
C. C. CUTLER
BY
F. W. Adams Jr.
ATTORNEY 3,058,106
Patented Oct. 9, 1962

3,058,106

SPACE SATELLITES FOR USE AS RADIO SYSTEM REPEATERS

Cassius C. Cutler, Gillette, N.J., assignor to Bell Telephone Laboratories, Incorporated, New York, N.Y., a corporation of New York Filed May 21, 1959, Ser. No. 814,711
4 Claims. (Cl. 343—100)

This invention relates to radio relay systems and more particularly to radio relay systems of the kind in which a space satellite traveling in orbit is employed as the repeater station for communication between two locations spaced at considerable distances on earth.

There have been many proposals for communication systems involving the use of space satellites traveling in orbit as the repeating stations for high frequency communication systems. Such systems, if realized, remove the familiar line-of-sight restriction which presently limits the range of microwave systems in over-water communications. The simplest space satellite repeater system comprises a transmitting station, a receiving station, and a single satellite serving, by reason of its reflecting surface, as a passive repeater by which energy radiated from the transmitter is redirected toward a receiver located beyond the line-of-sight range between the transmiting and receiving stations. More sophisticated communication systems employing satellites as repeaters may employ the satellite as a so-called active repeater, that is, as a relay station wherein the signal radiated from the earth transmitter is received, amplified, and reradiated in the direction of the earth receiver station. Such a repeater obviously requires the use of a power source and radio receiving and transmitting antennae arranged in the most efficient manner to redirect an incoming signal from earth.

In either class of satellite repeater radio relay systems referred to above, the question of polarization of the radio frequency signal energy becomes significant. Obviously, a passive repeater, being nothing but a reflector, must reradiate incoming energy in the same plane of polarization as it was received. In an active repeater, on the other hand, it is essential that the receiving and transmitting antennae there employed be properly oriented to receive incoming signals with the highest efficiency and to radiate signals with the polarization so chosen that they will be received on earth at the receiving station with the highest efficiency.

It can be shown, however, that if two antennae at spaced locations on the surface of the earth are arranged to radiate or receive waves which are linearly polarized in the same way as measured with respect to the respective antennae, these same waves will be seen at the location of the satellite traveling in orbit above the earth as signals having widely diverse polarizations. The fact that the earth is spherical rather than flat serves to accentuate the problem.

It is the object of the present invention to improve the efficiency of a space satellite communication system by eliminating the polarization dependency of signal strength as transmitted between the two ground stations by way of a satellite repeater.

In accordance with the above object, the system of the invention involves the provision of antennae at the transmitting and receiving stations, the support axes of which are so oriented with respect to each other that the polarization vector of energy transmitted or received by each antenna lies in a single plane which passes through the locations of the two earth antennae and the position of the satellite. When this is accomplished, the polarization problem is eliminated.

The above and other features of the invention will be discussed in detail in the following specification taken in connection with the drawings in which.

Figure 1:
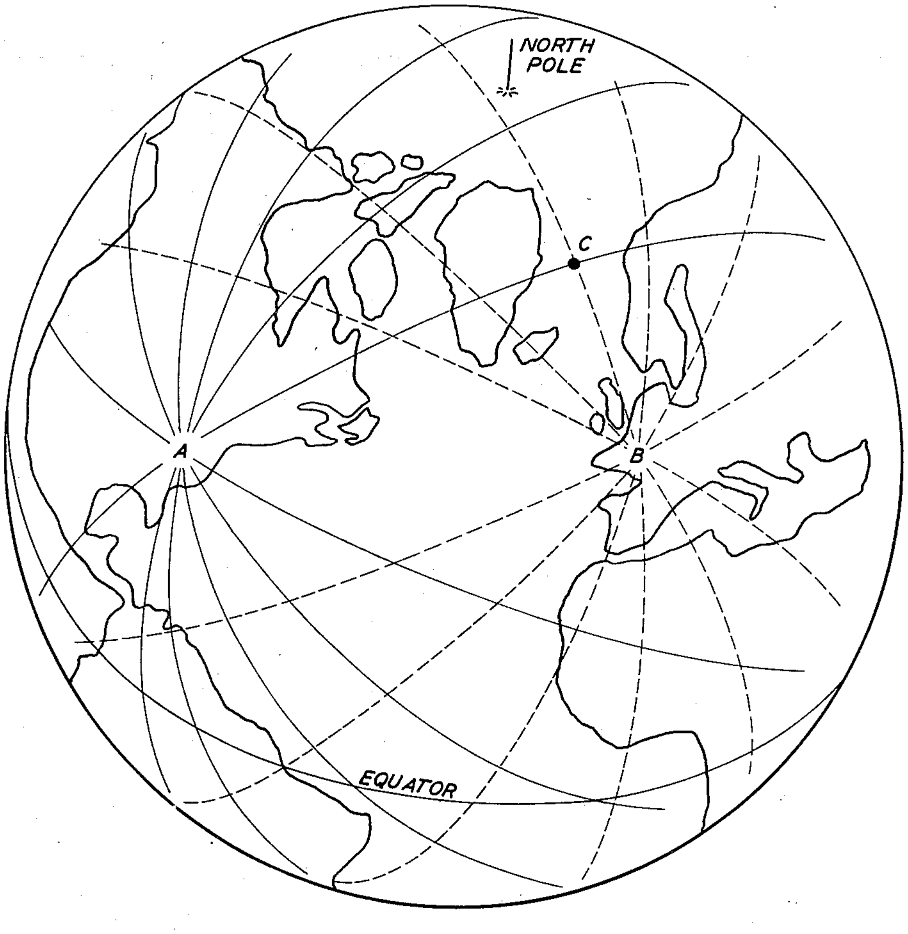
FIG. 1 is a representation of the earth upon which have been superimposed lines illustrating the polarization of signals emanating from specific transmitting and receiving sites.

FIG. 1 will be recognized as a representation of the earth and there are indicated thereon earth communication stations A and B. These stations may be thought of as comprising either a transmitter or a receiver, or both, together with an appropriate antenna system designed to radiate or receive radio frequency energy with a particular polarization for transmission from one station to the other by way of a space satellite repeater. The solid lines in FIG. 1, all of which pass through point A, are representations of the intersections with the surface of the earth of the great circle planes of the earth passing through point A and including the vertical to the surface of the earth at that point. The lines may also be thought of as the projections on the surface of the earth of the intersections of these planes with a sphere concentric with the earth at a radius equal to the altitude of the satellite to be used as a repeater at the particular time in question. Similarly, the dashed lines passing through point B may be considered as the equivalent of the solid lines passing through point A and represent the intersections with the surface of the earth of the great circle planes which include the vertical to the surface of the earth at point B. Obviously, an infinity of such planes may be passed through either point A or B.

If now, for purposes of simplicity, it is assumed that linearly polarized radio frequency waves are radiated from point A with the polarization vector in one of the vertical planes indicated by a solid line trace, the orientation of the polarization vector in space is determined by that plane. Similarly, if we assume that a linearly polarized radio frequency wave is transmitted from point B with the polarization vector falling within one of the planes defined by the dashed lines referred to above, the orientation of the polarization vector in space will always fall in that plane. Now, the satellite to be used as a repeater may be considered for purposes of discussion as being located at a point above the earth lying above the intersection of the projections on the earth of two of the great circle planes of FIG. 1. For example, the satellite may be thought of as being above the earth at the location indicated by point C.

It will be recognized that as seen from the location of the satellite above point C, the plane in which the incoming energy is polarized is almost at right angles to that in which the reflected energy must be polarized in order to reach the receiving station in the polarity for which that station's antenna system is designed. This situation will obtain with greater or lesser severity for all possible satellite locations other than those on the great circle plane which passes through both the transmitting and the receiving station as well as the satellite.

The problem outlined above is avoided in accordance with the invention by so mounting the antennae at the transmitting and receiving stations that the polarization vectors for the waves transmitted from or received by these antennae are at all times in the plane passing through the location of the two antennae and the location of the satellite. In all but exceptional cases, this plane will not be a great circle plane and may be considered instead as a slant plane passing through the surface of the earth through the locations of the two antennae but not including any diameter of the earth.

Figure 2:
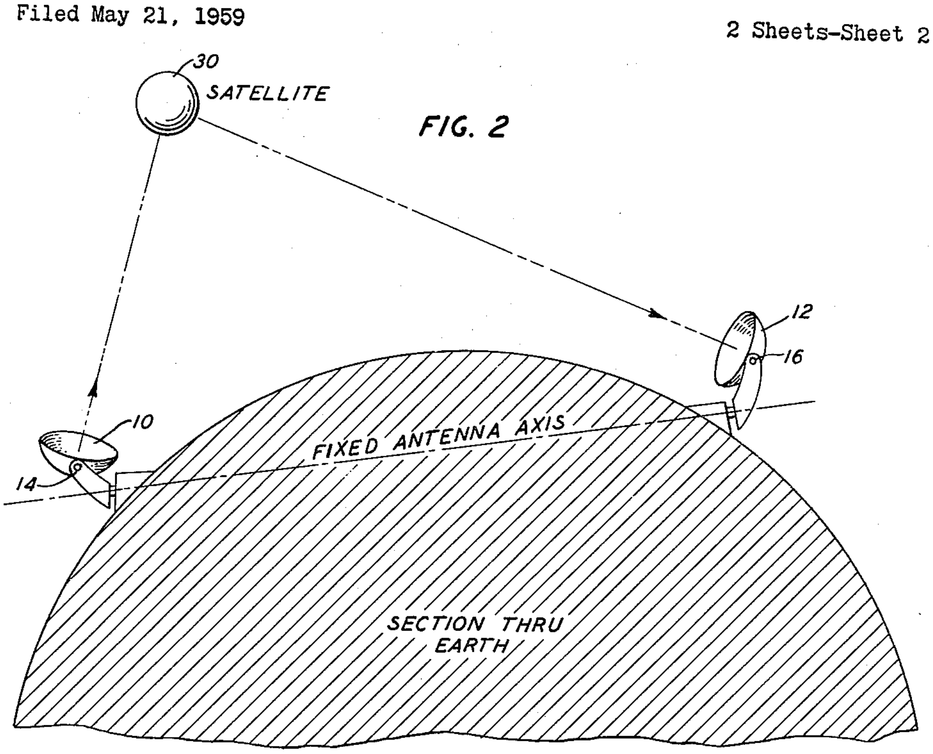
FIG. 2 is a sketch illustrating a satellite repeater communication system according to the invention.

This result may be accomplished in the case of conventional two-axis antenna mounts by the arrangement shown in diagrammatic form in FIG. 2. Two-axis antenna mounts are most commonly arranged to permit orientation of the antenna beam direction in either elevation or azimuth with respect to the surface of the earth at the location at which the mount is located. For such use, the first of the axes is normal to the surface of the earth at the location of the antenna and the second is in a plane normal to the first axis. In addition, the antenna is constructed to provide a radiation pattern, the axis or principal direction of which is normal to the second axis and in or parallel to the plane which includes the first axis. In this, or any other antenna mount in which the vertical is one axis of rotation, the polarization problem previously described will be encountered.

According to the invention, therefore, the transmitting antenna 10 and the receiving antenna 12 of a space satellite communication system employing a passive repeater satellite 30 are so mounted that the first axes of the two antenna mounts are colinear or coincident. Thus, and as shown in FIG. 2, the first axes of antennae 10 and 12 are the same and may be thought of as extensions of a single axis passing through the earth. The second axes 14 and 16 of antennae 10 and 12, respectively, are in planes at right angles to the common first axis as in the usual two-axis mount. Further, each of the antennae is so constructed that the direction of the radiated beam is always at right angles to the second axis and always lies in or parallel to a plane which includes the first axis. In such an arrangement and providing that the polarization of the two antennae is appropriately chosen, it can be assumed that the polarizations will both lie in the same plane, this plane being that determined by the location of antennae 10 and 12 and that of satellite 30.

Figure 3:
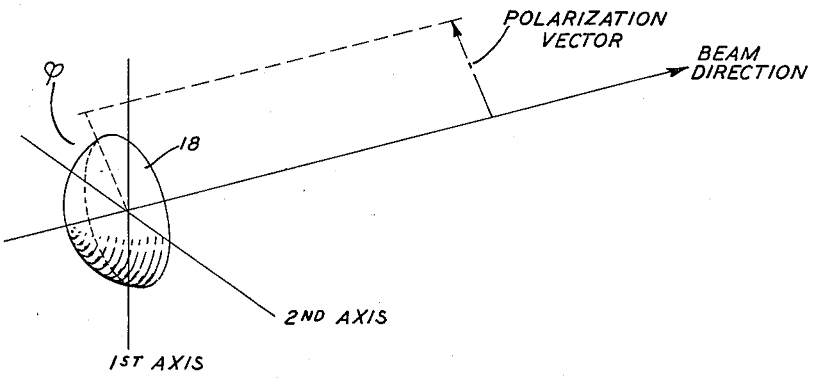
FIG. 3 is a vector diagram illustrating the significant relationships between the support axes and the polarization vector for an antenna arranged in accordance with the invention.

The condition implied above is met so long as the angles between the second axis of each mount and the respective planes at each antenna mount, defined by the polarization vector and the beam direction, are the same, measured in the same sense with respect to the corresponding beam direction. This requirement may be better understood by reference to FIG. 3 wherein there is shown an antenna reflector 18 mounted for rotation about first and second orthogonal axes. The beam direction is shown in FIG. 3, as at all times, at right angles to the second axis, and the plane defined by the polarization vector and the beam direction is indicated by dashed lines. The angle $\varphi$ is shown in FIG. 3 as the angle between the plane just defined and the second axis of the antenna suspension.

It will be apparent from a consideration of the geometry of the system just described that so long as the first axes of the two antennae coincide and so long as the angle as measured at each antenna with respect to the beam direction is the same and is measured in the same sense, the polarization vectors of the two antennae will fall in the same plane. If the antennae now are directed toward the satellite, the condition involving the location of the two earth stations and the satellite, and requiring that they be in the same plane, and in the same plane as the polarization vector, will be met. Under these circumstances, transmission between stations A and B will occur at the highest efficiency regardless of whether satellite 30 at location C is an active or passive repeater station since, in the first instance, the two antennae at the satellite may be oriented for the same polarization, and in the second, the polarization reversal upon the reflection will be of no significance.

What is claimed is:

1. In a radio system having terminal stations and a space satellite repeater, antennae for linearly polarized waves at said terminal stations, and antenna mounts for supporting the respective antennae for orientation with respect to the surface of the earth to direct the beams of the two antennae to the location of the satellite repeater, said antenna mounts being positioned with the polarization vectors of the two antennae lying in the plane defined by the locations of the two earth stations and the location of the satellite repeater.

2. In a radio system having terminal stations and a space satellite repeater, antennae for linearly polarized waves at said terminal stations, and mounts for supporting respective said antennae for rotation about a primary axis and a secondary axis lying in a plane normal to said primary axes to radiate a beam in a direction orthogonal to said secondary axes, said mounts being positioned with the polarization planes of the two antennae at all times lying in the same slant plane defined by the location of said terminal stations and that of said satellite repeater.

3. In a radio system having terminal stations and a space satellite repeater, antennae for linearly polarized waves at said terminal stations, and mounts for supporting said respective antennae for orientation about paired axes, the direction of the beam formed by said antennae beng at right angles to at least one of said orientation axes, the other orientation axis of each of said antennae being positioned with the polarization vectors thereof lying in the plane defined by the locations of said terminal stations and that of said satellite when both said antennae have the same polarization measured with respect to the beam direction and the second axis.

4. In a radio system having terminal stations and a space satellite repeater, antennae for linearly polarized waves at said terminal stations, and mounts for supporting said respective antennae for orientation about primary and secondary axes, the secondary axis lying in a plane normal to said primary axis and being normal to the beam direction, said mounts being so positioned that said primary axes are colinear and the angles between the planes at each mount, defined by the polarization vector and the beam direction, and the secondary axis are at the same angle, measured in the same sense with respect to the corresponding beam direction.

References Cited in the file of this patent

UNITED STATES PATENTS

| | | |
|---|---|---|
| 2,475,746 | Kenyon | July 12, 1949 |
| 2,542,823 | Lyle | Feb. 20, 1951 |
| 2,871,344 | Busignies | Jan. 27, 1959 |

FOREIGN PATENTS

| | | |
|---|---|---|
| 954,364 | France | June 6, 1949 |